P. H. WILSON.
APPARATUS FOR MEASURING, INDICATING, AND RECORDING THE FLOW OF FLUID.
APPLICATION FILED SEPT. 2, 1921.
1,414,388.
Patented May 2, 1922.
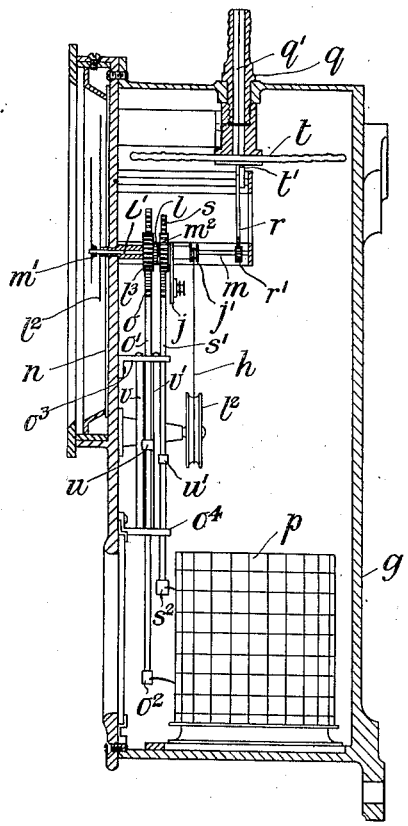
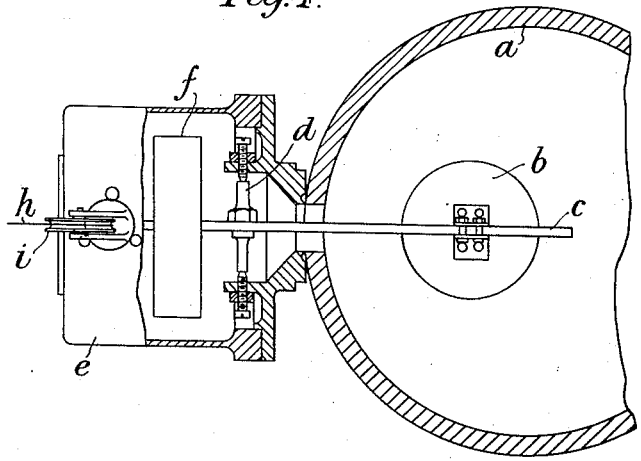
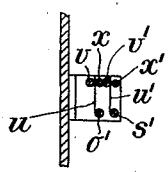
INVENTOR:
Percy H. Wilson
By Wm Wallace White
ATT'Y.

P. H. WILSON.
APPARATUS FOR MEASURING, INDICATING, AND RECORDING THE FLOW OF FLUID.
APPLICATION FILED SEPT. 2, 1921.
1,414,388.
Patented May 2, 1922.
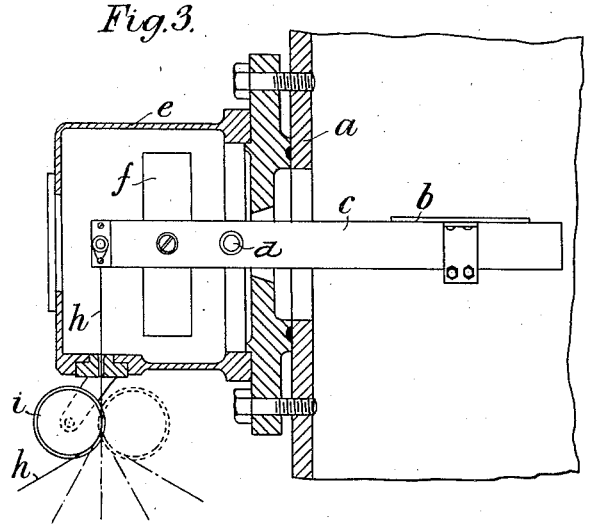
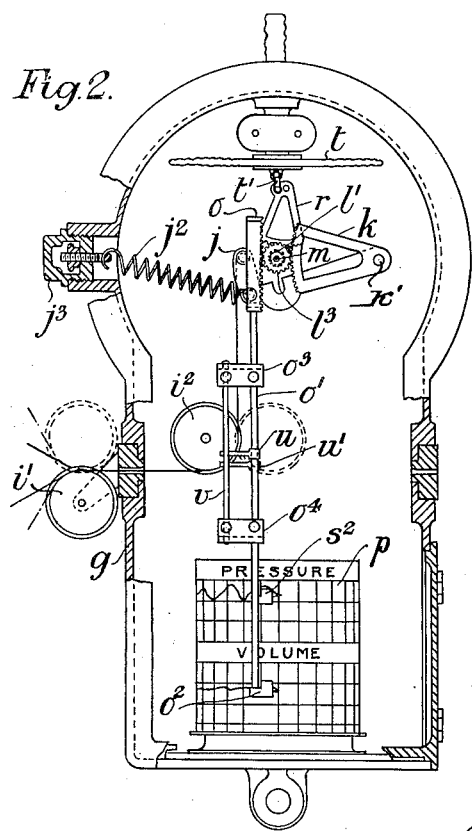
INVENTOR:
Percy H. Wilson
By Wm Wallace White
ATTY.

UNITED STATES PATENT OFFICE.

PERCY HUTCHINSON WILSON, OF NOTTINGHAM, ENGLAND.

APPARATUS FOR MEASURING, INDICATING, AND RECORDING THE FLOW OF FLUID.

1,414,388. Specification of Letters Patent. Patented May 2, 1922.

Application filed September 2, 1921. Serial No. 498,037.

(GRANTED UNDER THE PROVISIONS OF THE ACT OF MARCH 3, 1921, 41 STAT. L., 1313.)

To all whom it concern:

Be it known that I, PERCY HUTCHINSON WILSON, of 1ª Hamilton Drive, The Park, Nottingham, in the county of Nottingham, England, a subject of the King of Great Britain and Ireland, have invented certain new and useful Improvements in Apparatus for Measuring, Indicating, and Recording the Flow of Fluid, (for which I have filed an application in England, March 31, 1919, Patent No. 140,217,) of which the following is a specification.

This invention relates to apparatus for indicating and measuring the flow of fluids, of the type in which the movement of a pivoted arm placed in the path of the current, is transmitted to mechanism for indicating or recording the volume and pressure of the fluid passing along the duct. This invention consists in an improved and simplified means for transmitting the motion of the pivoted arm placed in the path of the flowing fluid to the indicating pointer which movement also operates a pen rod engaging a revolving recording chart. Combined with the same instrument is (or may be) a pressure or temperature indicating and recording mechanism which operates in unison with the before described volume indicating and recording means. The present invention has been devised for use in connection with the air supply to cupolas, blast furnaces, converters, ventilator systems, and for low pressure steam systems and other analogous purposes.

With apparatus for measuring, indicating and recording the flow of air or similar gaseous fluid made in accordance with this invention the simultaneous indicating and recording of the volume of air with or without the simultaneous indicating and recording of the pressure of air is effected.

By way of example I will describe how my invention may be applied to indicate and record the volume of air passing through a pipe (as for instance, the air supply pipe to a cupola), and at the same time be combined with a pressure indicating and recording apparatus.

The accompanying drawings illustrate such an arrangement, and as will be seen,

Fig. 1 is a side elevation in section of the indicating and recording portion of my improved apparatus.

Fig. 2 is a front elevation of same partly in section and with the front cover removed.

Fig. 3 is a sectional elevation of the portion of my improved apparatus attached to the air main.

Fig. 4 being a plan of the same.

Fig. 5 is a detail plan view of the pen rods and connections thereto.

The same letters refer to similar parts throughout the several views.

Within the air supply pipe or duct $a$ is situated a disc $b$ mounted on the end of a lever $c$ passing through the wall of the duct $a$ and pivoted at $d$ in a rain tight case $e$ attached to the duct $a$. This lever $c$ which carries an adjustable balance weight $f$ is connected by chains, links, rods or by a cord $h$ passing over a pulley $i$ as shown in Figs. 3 and 4, to the indicating and recording instrument $g$ which can be placed in any convenient position as desired. The cord $h$ on entering the instrument $g$ passes over pulleys $i^1$, $i^2$ and is wound around and attached to a projecting lug $j^1$ on one end of the pivoted arm $j$. This arm is secured to a short spindle or stud $k^1$, to which is also secured a toothed quadrant $k$ engaging a pinion $l$ on a sleeve $l^1$. This sleeve $l^1$ which is rotatably mounted on a shaft $m$ carries at one end a pointer $l^2$ adapted to move over a dial $n$ having graduations corresponding to various amounts of air, which may be indicated in thousands of cubic feet and parts thereof. Also on this sleeve $l^1$ I provide a pinion $l^3$ which works on a rack $o$ connected to a rod $o^1$, carrying at its lower extremity a pen $o^2$ for recording in graph form the volume of air on a chart $p$, mounted on a revolving drum actuated in the usual manner by clockwork.

The indicating and recording instrument $g$ I also provide with a pressure gauge $q$ of the diaphragm type for operating a toothed quadrant $r$ engaging a pinion $r^1$ mounted on the before mentioned shaft $m$ carrying a pointer $m^1$, at one end adapted to move over the dial $n$. The pointer $m^1$ is preferably shorter than the before mentioned pointer $l^2$ and travels over a series of graduations indicating the pressure of the air. I also provide on the shaft $m$ a pinion $m^2$ working in a rack $s$ connected to a rod $s^1$ carrying at its lower extremity a pen $s^2$ for recording in graph form the pressure on the revolving chart $p$. The pen rods $o^1$, $s^1$ pass through holes in the guide plates $o^3$, $o^4$, in which they are free to turn sufficiently to allow of a requisite turning movement of the pens $o^2$, $s^2$.

The action of my improved apparatus is as follows.

Under the influence of variations in the rate of the flow of air passing through the duct $a$, the disc $b$ and lever $c$ moving about a pivot $d$ impart motion by means of a cord $h$ passing over the pulleys $i$, $i^1$ and $i^2$ to the lug $j^1$ on the end of the pivoted quadrant arm $j$. This arm $j$ in turn actuates the pivoted quadrant $k$ which engages the pinion $l$ mounted on the sleeve $l^1$. The sleeve $l^1$ thereby moves the pointer $l^2$ over the graduated dial $n$ and so visually indicates the air volume, and at the same time rotates the pinion $l^3$ engaging the rack $o$ carrying the rod $o^1$ and the pen $o^2$ which is thus moved up or down upon the surface of the revolving chart $p$, so producing a graphic record of the volume of air passing along the duct $a$ at any given time. The movement of the pivoted quadrant arm $j$ is effected against the action of a spring $j^2$, the tension of which may be varied by means of a nut $j^3$ or by any other suitable means, in order to fix or to rectify the position of the pointer $l^2$ on the dial $n$, in relation to a given position of the disc $b$ and lever $c$ within the air supply pipe. The said spring $j^2$ also serves to return the volume pointer $l^2$ to zero when the air current is cut off.

The pressure of the air is recorded by means of the pressure gauge $q$ the air entering by the pipe $q^1$ and through the medium of the diaphragm $t$ and pivoted link $t^1$ operating the quadrant $r$ which engages the pinion $r^1$ on the spindle $m$, so that the pinion $m^2$ on the same spindle is moved and raises or lowers the toothed rack $s$, rod $s^1$ and pen $s^2$ thus graphically recording the air pressures on the revolving chart $p$. The movement of the spindle $m$ also causes the pointer $m^1$ to travel over the part of the dial $n$ graduated for air pressures, thus visually indicating the pressure at any given moment. It will be obvious that in cases where temperatures are to be indicated and recorded, similar mechanism to that last described may be employed except that the movement of the diaphragm $t$ will be effected by a thermostat.

From the foregoing it will be seen that with my improved apparatus it is possible to simultaneously indicate and record the volume of air passing through pipes or ducts and if desired the pressure of the air may be simultaneously indicated and recorded.

The cord $h$ communicating motion over the pulleys $i$, $i^1$ and $i^2$ can be carried at any suitable angle desired either to the right or left as shown in dotted lines in Figs. 2 and 3.

The indicating and recording mechanism can be fitted entirely to the front screwed on cover of the case.

Weak flat springs $u$ and $u^1$ may be attached to the rods $o^1$ and $s^1$ and the free ends of said springs rest lightly on fixed round rods $v$, $v^1$ to give the necessary torque to press the pens $o^2$ and $s^2$ on the chart $p$. To prevent the pens from turning too far in when the drum is removed for replacing the chart, two extra smooth rods $x$, $x^1$, (see Fig. 5) are fixed between the guide plates $o^3$, $o^4$, parallel to the aforementioned two rods $v$, $v^1$ so that the light springs $u$ and $u^1$ are prevented from moving too far and thus letting the racks $o$ and $s$ out of gear with the pinions $l^3$ and $m^2$.

In cases where my improved apparatus is made for volume indicating alone, the gearing for operating the pointer may be operated directly from the pivoted lever $c$.

What I claim and desire to secure by Letters Patent is:—

1. Apparatus for measuring the volume of air or other fluid passing through a pipe or chamber comprising a casing on the pipe or chamber, a lever pivoted in the casing and projecting into the pipe or chamber, a partial obstruction to the flow of fluid in the pipe or chamber disposed on the lever, a second casing separate from the casing on the pipe or chamber, a spring controlled toothed quadrant pivoted in the second casing, means for transmitting movement of the lever to the spring controlled quadrant, a pinion engaged by the spring controlled quadrant, a pointer adapted to be deflected over a dial by movement of the pinion engaged by the spring controlled quadrant to indicate the volume of fluid passing and a pen adapted to record in graph form the volume of fluid passing on a moving chart, means being provided whereby the pen is actuated by movement of the pinion engaged by the spring controlled quadrant.

2. Apparatus for measuring the volume of air or other fluid passing through a pipe or chamber comprising a casing on the pipe or chamber, a lever pivoted in the casing and projecting into the pipe or chamber, a partial obstruction to the flow of fluid in the pipe or chamber disposed on the lever, a second casing separate from the casing on the pipe or chamber, a spring controlled toothed quadrant pivoted in the second casing, means for transmitting movement of the lever to the spring controlled quadrant, a pinion engaged by the spring controlled quadrant, a sleeve on which is mounted the pinion engaged by the spring controlled quadrant, a spindle on which the sleeve is mounted, a pointer on the sleeve adapted to be deflected over a dial by rotation of the sleeve, a second pinion on the sleeve, a rod provided with a toothed rack at one end adapted to be moved up and down by the second pinion on the sleeve, a pen on the rod adapted to record in graph form the volume of fluid passing on one half of a moving chart, a supplementary pipe leading from the pipe or chamber to the second mentioned casing, a diaphragm sensitive to differences in pressure disposed in the second mentioned casing and connected to the supplementary pipe, a pinion keyed to the spindle on which the sleeve is mounted, means whereby movement of the diaphragm rotates the pinion on the spindle, a pointer on the spindle adapted to be deflected over the same dial as the pointer on the sleeve to indicate the pressure of fluid in the pipe or chamber, a second pinion on the spindle, a rod provided with a toothed rack adapted to engage said second pinion on the spindle and be moved up and down and a pen on said rod adapted to record in graph form on the other half of the moving chart the pressure of the fluid in the pipe or chamber.

In testimony whereof I have signed my name to this specification.

PERCY HUTCHINSON WILSON.